United States Patent
Kuhn (12)

(10) Patent No.: US 6,400,305 B1
(45) Date of Patent: Jun. 4, 2002

(54) WIDE BAND RADAR DETECTOR WITH THREE-SWEEP INPUT STAGE

(75) Inventor: John Kuhn, West Chester, OH (US)

(73) Assignee: Escort, Inc., Cincinnati, OH (US)

( * ) Notice: Subject to any disclaimer, the term of this patent is extended or adjusted under 35 U.S.C. 154(b) by 0 days.

(21) Appl. No.: 09/736,490

(22) Filed: Dec. 13, 2000

(51) Int. Cl.[7] .............................. G01S 7/36; G01S 7/42; G01S 13/00; H04B 1/16

(52) U.S. Cl. ..................... 342/20; 342/193; 342/195; 455/228

(58) Field of Search .................... 342/20, 21, 192, 342/193, 195; 455/226–228

(56) References Cited

U.S. PATENT DOCUMENTS

| | | |
|---|---|---|
| 4,313,216 A | 1/1982 | Jaeger et al. |
| 4,581,769 A | 4/1986 | Grimsley et al. |
| 4,750,215 A | 6/1988 | Biggs |
| 4,862,175 A | 8/1989 | Biggs et al. |
| 4,954,828 A | 9/1990 | Orr |
| 5,305,007 A | 4/1994 | Orr et al. |
| 5,461,383 A * | 10/1995 | Ono et al. ................. 342/20 |
| 5,852,417 A | 12/1998 | Valentine et al. |
| 5,856,801 A | 1/1999 | Valentine et al. |
| 5,900,832 A | 5/1999 | Valentine et al. |
| 5,917,441 A | 6/1999 | Valentine et al. |
| 6,154,166 A * | 11/2000 | Sawada et al. ............. 342/20 |
| 6,175,324 B1 * | 1/2001 | Valentine et al. .......... 342/20 |

* cited by examiner

Primary Examiner—Thomas H. Tarcza
Assistant Examiner—Brian K Andrea
(74) Attorney, Agent, or Firm—Wood, Herron & Evans LLP

(57) ABSTRACT

A police radar detector detects police radar signals in the X, K and wide Ka police radar bands and rejects interfering Ka band signals that are a higher harmonic of a nuisance source having a fundamental frequency adjacent to the X police radar bands. Each of the three police radar bands is separately swept in a first mixer stage with the resulting IF signal concurrently demodulated in two IF circuits. The first IF circuit detects signals that were received in the X, K and outer portions of the wide Ka band during respective sweeps. The second IF circuit detects nuisance signals adjacent to the X and K bands, and the inner portion of the wide Ka band during respective sweeps.

43 Claims, 4 Drawing Sheets

WIDE BAND RADAR DETECTOR WITH THREE-SWEEP INPUT STAGE

FIELD OF THE INVENTION

The present invention relates to police radar detectors, and more particularly, to sensitive wide band radar detectors that alert drivers to the presence of X, K, and/or wide Ka band police radar signals without responding to interfering signals such as are generated by the local oscillator ("LO") of other radar detectors.

BACKGROUND OF THE INVENTION

An electronic assembly for detecting the presence of police radar signals from a police radar unit is generally known, and will be referred to herein as a radar detector. In use, the radar detector is mounted in a vehicle and provides an audible and/or visual indication of the presence of a police radar signal.

Signals emitted by a police radar unit may travel a substantial distance from that unit. As is well understood, the police radar signal must travel to the vehicle under surveillance and then be returned altered by a Doppler shift representing speed of the vehicle. Microwave police radar signals lose strength as they travel over the distance between the police radar unit and the vehicle under surveillance. The greater that distance, the weaker the return police radar signal, such that at some distance and beyond, the police radar signal is too weak to return to the police radar unit and be evaluated for speed of the vehicle (detection range).

It is desirable that the radar detector capture the police radar signal while it is so weak as to be beyond the detection range of the police radar unit. However, as with the police radar unit, the greater the distance between the radar detector and the source of the police radar signal, the weaker the police radar signal. At some distance from the police radar unit, the police radar signal may be so weak that the radar detector is unable to distinguish the police radar signal from noise, meaning that a police radar signal will not be captured until the vehicle moves closer to the police radar unit. The maximum distance at which the police radar signal can still be detected and an alert given to the driver may be referred to as the capture range of the radar detector. It is clearly advantageous to design the radar detector to be sensitive and fast enough to detect police radar signals and give an alert to the driver with sufficient time to react before the vehicle is within the detection range of the police radar unit.

In order to detect very weak signals, it is necessary for the circuitry to also deal with the noise that is inherently present at low energy levels. Thus, increasing the capture range by lowering the threshold at which a signal may be considered also requires circuitry to handle the concomitant noise, otherwise the noise can be a source of unwanted and detrimental false alarms. The problems are further complicated with some of the frequencies employed for police radar signals. In particular, at higher frequencies, the police radar signal drops off or becomes weaker over ever shorter distances. Consequently, the capture range of the radar detector can become quite short, meaning that the time available to react before coming into the police radar units' detection range grows smaller, and in some cases can be non-existent unless steps are taken to maximize the detector's capture range.

Additionally, some police radar units are of the "instant-on" type meaning that they may be used in a manner to intermittently emit only short bursts of police radar signals. These instant-on police radar units tend to be higher frequency as well. Where the bursts are only given infrequently, the first burst may be given when the radar detector is too far away to detect that burst, i.e., at that distance, the signal from the police radar unit is outside the capture range of the radar detector because it is below the sensitivity threshold of the radar detector. The second burst may come after the vehicle is within the detection range of the police radar unit. Under such circumstances, the driver will have had no advance warning that the vehicle is under surveillance. Accordingly, it is desirable to extend the capture range of the radar detector so as to enhance possible early detection of such instant-on police radar signals as well.

The circuitry and techniques utilized to detect police radar signals have become quite sophisticated, and in turn, so have the police radar units. Radar detectors must be able to quickly detect very weak signals, separate them from the noise, determine whether the signal is a valid police radar signal, and if so, give an alert to the driver. All of these functions require some amount of processing time which necessarily affects the detection range of the radar detector and might thus allow the vehicle to move towards the police radar unit until at last an alert is given.

During the 1980's, police radar detectors typically covered only two microwave radio frequency (RF) bands, the so-called X band and K band. Radar detectors designed to deal with those two bands generally provided sufficient detection range for most situations. The recent addition of Ka band, and especially wide Ka band, police radar has complicated matters, as will be discussed.

In general, the X band is often defined to cover the frequency range of 8.00 GHz to 12.00 GHz, but more typically defined as the International Telecommunications Union (ITU) assigned band of 8.50 to 10.68 GHz. The Federal Communications Commission (FCC) of the United States allocated a portion of the X band of 10.50 to 10.55 GHz for police radar signals. Similarly, the K band is often defined to cover the frequency range of 18.00 GHz to 27.00 GHz, but more typically defined as the ITU assigned band of 23.00 GHz to 24.20 GHz. The FCC allocated a portion of the K band of 24.10 GHz to 24.20 GHz for police radar signals. As used hereinafter, the terms "X band" and "K band" will generally be meant to refer to the portions of the spectrum allocated to police radar signals in those bands as above described.

U.S. Pat. No. 4,313,216 ("the '216 patent"), the disclosure of which is hereby incorporated herein by reference in its entirety, sets forth an example of circuitry and techniques to detect whether a received signal is in the X band or K band, and is thus a possible police radar signal. The '216 Patent discloses a superheterodyne receiver with a first swept local oscillator ("LO") having a fundamental frequency or first harmonic, centered at 11.5583 GHz, and in a frequency range adjacent to the police radar X band (i.e., within the broadest definition of the X band, but just outside the defined police radar X band). The second harmonic of the LO is centered at 23.1166 GHz, and is similarly in a frequency range adjacent to the police radar K band (i.e., within the broader definition of the K band, but just outside the defined police radar K band). Due to the adjacency of the LO first and second harmonics to the X and K bands, respectively, when the LO signal is mixed with signals in either of those bands, there will be produced intermediate frequency (IF) signals in the same frequency range, such as centered around 1.02 GHz. The 1.02 GHz IF signals are mixed with a second LO signal, such as a fixed frequency at about 1.03 GHz, to produce 10 MHZ IF signals, which may then be dealt with by lower frequency IF circuitry, such as bandpass filters, FM discriminators and/or quadrature detectors. Due to the adjacency of the LO frequency harmonics to the X and K bands, the IF circuitry will produce pairs of closely spaced S-curves. Each associated pair of S-curves has a time positioning relative to the beginning of the sweep and a time spacing therebetween which correlates the pair to a signal in the X band or the K band, and thus allows for identification of the band of the received signal, as well as the approximate frequency thereof in that band.

Some radar detectors leak some of the RF energy generated by their LO's. That energy could create signals that would appear to another radar detector as though they were police radar signals in the X band and/or the K band. Elimination of such nuisance signals has been accomplished by taking advantage of certain characteristics of LO signals as shown, for example, in U.S. Pat. Nos. 4,581,769; 4,750,215 and 4,862,175, the disclosures of each of which are hereby incorporated herein by reference in their entireties. Further enhancements aimed at improving the reliability and detection range of the detector include the addition of digital signal processing ("DSP") such as that disclosed in U.S. Pat. No. 4,954,828, the disclosure of which is also incorporated herein by reference in its entirety.

In addition to the X band and the K band, a narrow portion of the Ka band became available for police radar use. Generally, the Ka band includes 27.00–40.00 GHz, while the ITU assigns the Ka band as frequencies between 33.4–36.0 GHz. For police radar purposes, the narrow portion of 34.2–34.4 GHz in the Ka band was first made available for police radar use. That portion of the Ka band will be referred to hereinafter as the narrow Ka band. The LO used in the detectors shown in the '216 and '828 patents has a third harmonic centered at 34.6749 GHz which, similar to the first and second harmonics, is in a range of frequency adjacent to the police radar band of interest, this time being the narrow Ka band (i.e., the third harmonic of the LO signal is within the broader defined Ka band, but just outside the defined police radar narrow Ka band). Consequently, the third harmonic of the existing first LO was found to be useful in also detecting narrow Ka band police radar signals using generally the same techniques as employed for X and K band police radar signals as described above.

However, the FCC has expanded the available Ka band spectrum available for police radar by defining a wide Ka band to include frequencies between about 33.4–36.0 GHz, thus including not only the narrow Ka band, but higher frequency portions of the Ka band as well. As used herein, the term wide Ka band is thus a reference to the expanded Ka spectrum available for police radar.

Availability of the wide Ka band for police radar signals created significant challenges to generally known police radar detectors. The expanded Ka band is significantly wider than the 50 to 200 MHZ range of the X, K and/or narrow Ka bands. Thus, the typical LO sweep was no longer wide enough to cover the entire wide Ka band, necessitating changes in generally known superheterodyne receivers. One particular change was to slightly change the center frequency of the LO, and vary its sweep range. In one sweep, the LO was set to sweep across a range that would include both the X and K bands, such that the first and second harmonics of the LO would produce IF signals centered around 1.02 GHz. These LO signals would be mixed with a second LO to produce 10 MHZ IF signals which could then produce associated pairs of S-curves in the IF circuitry as before, whereby to produce information correlated to the X and K bands. In another sweep, the LO sweep range was expanded such that, at the third harmonic, signals throughout the wide Ka band would mix therewith to produce 10 MHZ IF signals. As these IF signals were already at 10 MHZ, the second LO mix could be bypassed, and the S-curve pairs generated directly. The variable range LO approach is shown, for example, in U.S. Pat. No. 5,305,007 ("the '007 patent"), the disclosure of which is hereby incorporated by reference herein in its entirety.

The wide Ka band additionally posed a unique nuisance suppression challenge not previously encountered with X, K and narrow Ka band radar signals. In particular, while the first and second harmonics of the LO are still outside the police radar X band and K band, the third harmonic falls squarely within the wide Ka band allocated for use by police radar units. When other radar detectors leak LO signals, the third harmonic signals may thus appear as valid wide Ka band signals. As a consequence, it became necessary to develop circuitry and techniques by which to determine if the signal received in the wide Ka band is real (i.e., a valid police radar signal) or false (e.g., a nuisance signal such as an LO signal from another detector), otherwise drivers would likely be given many false alerts in response to nearby radar detectors. The '007 patent also proposed a solution to the problem of false wide Ka band signals as well.

In particular, a nuisance signal in the wide Ka band caused by a leaky LO, for example, would, in addition to the third harmonic that causes the nuisance, also have one or both of a first and second harmonic that would be just outside, but in a range of frequency adjacent to, the X band or K band of interest, respectively. By contrast, a valid police radar signal in the wide Ka band would have no such related harmonic. Using that distinction, it was determined that the range of the X and K band sweep of the LO could be made large enough so as to cover not only the X and K bands, but to also cover the adjacent range of frequencies likely to include the harmonic(s) of the interfering LO. As a result, associated S-curve pairs would also be produced for these so-called "interfering X" or "interfering K" signals.

Any associated S-curve pair generated during the Ka band, especially those having a frequency correlation to that portion of the wide Ka band including the third harmonic of possible interfering LO signals, may be examined against the results from the X/K band sweep. If the wide Ka band associated S-curve pair is found to have a harmonic relationship with an associated S-curve pair correlated to either or both of an interfering X or an interfering K signal from the X/K band sweep, then the wide Ka band signal may be rejected, whereas if no such harmonic relationship is found, then the signal received during the wide Ka band sweep may be considered to be from a police radar unit and an alert given. The '007 patent thus discloses and claims rejection of wide band Ka signals having a harmonic relationship with signals in either or both of the X band and/or the K band.

While the nuisance signal rejection accomplished with the techniques disclosed and claimed in the '007 patent is quite advantageous, further improvements are desired, including advances to increase the capture range of the radar detector. U.S. Pat. No. 5,852,417 ("the '417 patent") relates to a radar detector that is said to have increased sensitivity, and hence increased capture range, through the use of Low Noise Amplifiers (LNA's) operating in the X, K and/or Ka bands. While such (LNA's) are believed to enhance sensitivity, the radar detector circuitry of the '417 patent presents other undesirable performance characteristics. In particular, the radar detector of the '417 patent utilizes an LO having harmonics that are not adjacent to either the X or the K bands, and is instead well outside of even the broadest definitions of these bands. As a result, while there may be improved sensitivity, the radar detector of the '417 patent lacks the ability to either directly determine band from associated S-curve pairs for each detected signal, or to reject wide Ka band signals due to the presence of either one of a harmonically related X band or K band signal. With respect to band detection, the LO frequency is so far removed from the band of interest that IF signals produced in the radar detector of the '417 patent do not produce associated S-curve pairs which can be used to identify the band of the received signal. Instead, additional signals must be injected by the radar detector into the IF signals to determine the band of the received signal.

With respect to rejection of wide Ka band signals, the LO fundamental frequency of the '417 patent radar detector is selected such that the range of frequency adjacent to the X band, where the first harmonic of most interfering LO signals would reside, is not captured. Thus, the first harmonic of interfering LO signals cannot be detected by the circuitry of the '417 patent. Instead, the LO frequency is selected such that only interfering K signals may be detected, meaning that a wide Ka band signal is rejected only if the harmonically related K band interfering LO signal is also detected. Thus, while the radar detector of the '417 patent utilizes the concepts of the '007 patent to ignore a wide Ka band signal when there is a harmonically related signal in the K band, that solution is not entirely satisfactory. By way of example, the system of the '417 patent can be fooled by nuisance signals leaking from radar detectors that have K band image filters. Those devices, while still emitting the first harmonic, will generally suppress the second harmonic of the LO. The radar detector of the '417 patent can not detect the first harmonic of the LO and so will give an alert in response to detection of the third harmonic from such radar detectors as if a valid police radar signal in the wide Ka band had been received.

Therefore, a significant need exists for improving sensitivity of a police radar detector without sacrificing the advantages of an LO that is at a frequency adjacent to either one or both of the lower frequency bands of interest (e.g., the X and K bands), including the suppression of false wide Ka band signals afforded thereby.

SUMMARY OF THE INVENTION

The present invention provides a police radar detector that takes advantage of the sensitivity improvements offered by LNA's, but without sacrificing the advantages of operating with an LO having harmonics at frequencies adjacent to at least the X or K bands. To this end, and in accordance with the principles of the present invention, an adjacent frequency LO is swept three separate times, one for each of the X, K, and wide Ka bands, and a pair of IF circuits produce for each such sweep, respective first and second pairs of S-curve or IF signals. The respective first pairs of IF signals produced from the two X and K band sweeps are correlated to signals in those bands, whereas the respective second pair of IF signals produced from those two sweeps are correlated to interfering X and interfering K signals, respectively, such as would be produced by the first harmonic or second harmonic of an interfering LO. When the wide Ka band is swept, the first pairs of IF signals are correlated to signals from a portion of the wide Ka band that would not be expected to include LO third harmonics, while the second pairs of IF signals would be correlated to signals in a second portion of the wide Ka band which could include both valid police radar signals and/or interfering third harmonic LO signals.

The use of separate sweeps and dual IF circuits provides several advantages. In accordance with one aspect of the present invention, there are provided separate X band and K/Ka band LNA's which are selectively energized depending on the band to be swept. The separate sweeps thus allow for the use of such tuned LNA's, so as not to require the use of a single amplifier, for example, to handle the broad spectrum of X, K and wide Ka bands. Such a single amplifier would likely be very large and expensive and inherently noisy over some portions of those bands, thereby adversely affecting sensitivity or capture range. In accordance with a second aspect of the invention, dual IF circuits are both responsive to signals detected during each sweep. The use of separate sweeps for each band and dual IF circuits allows for immediate and automatic identification of the band of the received signal based on which sweep is undertaken, with the further advantage that wide Ka band signals can be promptly determined to be valid or false by comparison of the harmonic relationship or lack thereof between the second pairs of IF signals from the wide Ka band sweep with either or both of the second pairs of IF signals from the X and/or K band sweeps. Thus, the radar detector of the present invention provides the advantages of the wide Ka band spurious signal rejection of '007 patent, while taking advantage of this improved sensitivity provided by the '417 patent, but without the drawbacks associated therewith.

By virtue of the foregoing, there is thus provided a police radar detector which has improved sensitivity without sacrificing the advantages of an LO that is at a frequency adjacent to at least the lower bands of interest, including the suppression of false wide Ka band signals afforded thereby.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE DRAWINGS

Figure 1:
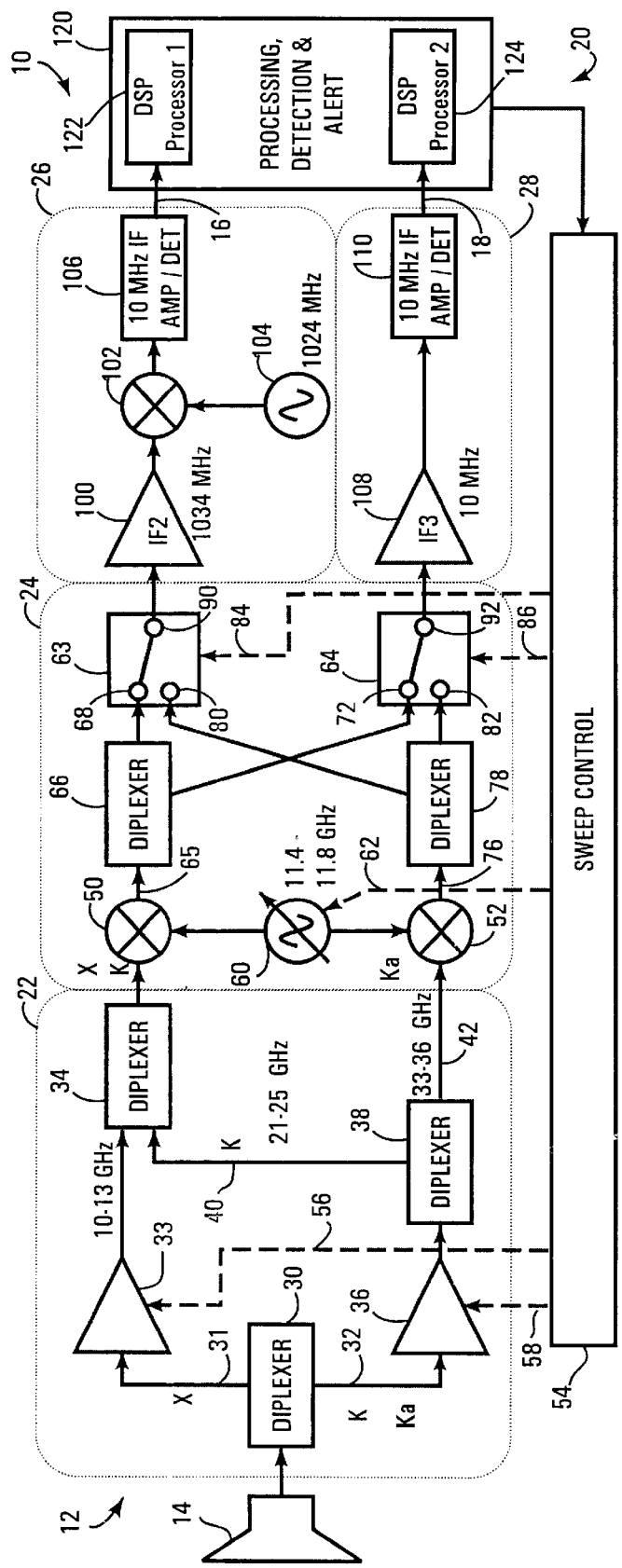
FIG. 1 is a block diagram of a police radar detector according to the principles of the invention.

With reference to FIG. 1, there is shown a police radar detector 10 in accordance with the principles of the present invention. Radar detector 10 includes a 3-sweep input stage or receiver front-end 12 which receives pulsed or continuous RF police radar signals in the X, K and wide Ka bands, as well as interfering LO harmonic signals from other radar detectors (not shown), at wide band antenna 14, and outputs first and second pairs of IF signals as at 16 and 18, respectively, correlated to the received signals for use by receiver back-end 20 which determines from the pairs of IF signals 16, 18 whether the received signals are valid police radar signals in the X, K or wide Ka bands and/or rejects them as interfering LO signals, especially in the wide Ka band as will be explained in greater detail below. Back-end 20 further controls front-end 12 so as to control which police radar band is to be swept at any given time.

Front-end 12 includes an RF band separation stage 22 which receives the RF signals from wide band antenna 14 and couples respective X, K and/or wide Ka band received and amplified signals to first mixer stage 24, which selectively mixes the received RF amplified signals with an appropriate harmonic of an LO signal to produce IF outputs coupled to a pair of IF circuits 26 and 28 which produce the respective pairs of IF signals 16, 18. Band separation stage 22 includes a first diplexer 30 operatively coupled to horn antenna 14 to receive and divide the RF signals from horn antenna 14 into a first frequency group such as signals in or adjacent to the X band on output 31, and a second frequency group comprised of signals in the K band and adjacent frequency range and the wide Ka band on output 32. Output 31 of diplexer 30 is coupled to an X band Low Noise Amplifier (LNA) 33 which, when enabled or energized, is tuned to amplify the X band and adjacent range of frequency signals which are then coupled to a second diplexer 34. Similarly, output 32 of diplexer 30 is coupled to a K/Ka band Low Noise Amplifier (LNA) 36 which, when enabled or energized, is tuned to amplify signals in the K band and adjacent frequency range and wide Ka band, the amplified signals of which are coupled to a third diplexer 38. Third diplexer 38 divides the K and wide Ka band signals into the respective K and wide Ka bands on outputs 40 and 42, respectively. Output 40 is coupled to diplexer 34 which couples one or the other of the amplified X and K band and adjacent range of frequency signals to a first mixer 50 in first mixer stage 24. Similarly, diplexer 38 couples amplified wide Ka band signals to second mixer 52 of first mixer stage 24.

One suitable fabrication of front-end 12 is a planar transmission type of media. In particular, the antenna 14 may include a single-ridged wave guide, or horn, that transitions to a microstrip topology for the remainder of the front-end 12. Amplifiers 33,36 formed from microstrip techniques advantageously prevent energy from the first mixer stage 24 from reaching and being radiated by the antenna 14.

Back-end 20 includes a sweep control 54 which switchably controls LNA's 33 and 36 via band select lines 56 and 58, in particular D.C. bias voltages, which are selectively on or off. When band select line 56 is on, band select line 58 is off such that LNA 33 is energized to couple amplified X band signals to diplexer 34 to be thereafter coupled onto mixer 50. As band select signal 58 is off, amplifier 36 is also off meaning that no amplified K or wide Ka band signals are coupled to or through diplexer 38. Alternatively, band select line 56 may be off and band select line 58 on, to thereby turn off LNA 33 and energize LNA 36. With that state of select lines 56 and 58, no amplified X band signals will be coupled to diplexer 34. Instead, amplified K and wide Ka band signals will be coupled to diplexer 38, and then on to respective diplexer 34 and mixer 50, or mixer 52. First mixer stage 24 is then adapted to either mix X signals in first mixer 50 with signals from first LO 60, or to mix first LO signals from LO 60 with K signals in mixer 50 and wide Ka band signals in mixer 52. In the embodiment shown herein, LO 60 is selected to have a frequency sweep range of 11.4 to 11.8 GHz and will sweep in response to sweep control signal 62 of sweep control 54 which initiates each sweep of the band as selected by band select lines 56 and 58 in cooperation with state select RF switches 63, 64 as will be described hereinafter.

Provision of two mixers 50, 52 is advantageous in that the second mixer 52 may be optimized for harmonic mixing with the wide Ka band signals from diplexer 38 and a third harmonic LO signals from oscillator 60 mitigating the increased noise and losses of third harmonic mixing. Mixer 50 is coupled on its output to provide first IF signals at 65 to diplexer 66 which selectively couples the IF signal to a first input 68 of the first RF switch 63 and the first input 72 of a second RF switch 64. The output of second mixer 52 is another first IF signal at 76 which is coupled to diplexer 78, the outputs of which are coupled respectively to a second input 80 of switch 63 and second input 82 of switch 64.

Sweep control 54 also operates to control the state of switches 63 and 64 under control of IF select switch lines 84 and 86. When state select switch lines 84 and 86 are both in a first state, switches 63 and 64 are also in a first state which cause the first inputs 68, 72 of respective switches 63 and 64 to be coupled to their outputs 90 and 92 thereof. Thus, in the first state, either IF signals correlated to X band received signals or IF signals correlated to K band signals (but not both due to band select lines 56, 58), from diplexer 66 are coupled into first and second IF circuits 26 and 28 for purposes to be hereinafter described. Alternatively, when state switch lines 84 and 86 are both in the second state, switches 63 and 64 are caused to switch to a second state, such that inputs 80 and 82 of switches 63 and 64 are coupled to respective outputs 90 and 92. Thus, only IF signals correlated to wide Ka band received signals are coupled to IF circuits 26 and 28. Advantageously, switches 63 and 64 are placed in their first state when a sweep of either the X or the K band is desired as dictated by the state of band select lines 56 and 58. As a consequence, during one sweep with amplifier 33 on and amplifier 36 off, IF signals correlated to X band signals will be coupled to the first and second IF circuits 26 and 28. In another sweep with amplifier 33 off and amplifier 36 on, IF signals correlated to the K band will be coupled to IF circuits 26 and 28. In a yet further sweep, switches 63 and 64 are caused to be in their second state, amplifier 33 is off and amplifier 36 is on. As a consequence, during this yet further sweep, IF signals correlated to wide Ka band signals will be coupled to first and second IF circuits 26 and 28. Thus, it may be seen that three separate sweeps of local oscillator 60 will be required to produce IF signals to IF circuits 26 and 28 for each of the X, K and wide Ka bands.

Local oscillator 60 has a frequency range selected such that during separate sweeps of the X and K bands, respectively, signals in the X band or the K band will produce IF signals at output 90 that are at approximately 1.034 GHz, whereas signals in the band of frequencies adjacent to the band being swept, i.e., either the X band or the K band, will produce IF signals at output 92 that are at approximately 10 MHZ. Similarly, during the separate sweep of the wide Ka band, IF signals output at 90 will be at approximately 1.034 GHz for a first portion of the wide Ka band that is not expected to include a third harmonic, for example, of an interfering LO signal such as in the lower and higher aspects of the wide Ka band. IF signals output at 92, on the other hand, would be correlated to a second portion of the wide Ka band between the lower and upper aspects wherein there might be expected to be received not only valid police radar signals, but also interfering signals such as due to the third harmonic of an interfering LO from another radar detector (not shown).

It should be appreciated that the IF signals at outputs 90 and 92 may be the same or contain the same components (e.g., a 1.034 GHz component and a 10 MHZ component), but that the IF circuits 26, 28 to which the respective outputs are coupled will produce signals correlated to either the 1.034 GHz component or the 10 MHz component, respectively. In this regard, IF signals from output 90 are amplified in 1.034 MHZ amplifier 100 and coupled to mixer 102, to mix those amplified signals with a second local oscillator signal from LO 104 which may be at 1.024 GHz, so as to produce lower frequency IF signals centered, for example, at about 10 MHZ. The resulting signals from mixer 102 are then coupled through a 10 MHZ IF amplifier/detector 106 which produces the first pairs of associated S-curve outputs 16 correlated to the X band, K band or first portion of the wide Ka band. Similarly, IF signals from output 92 are coupled through a 10 MHZ amplifier 108 and then on to another 10 MHZ IF amplifier/detector 110, to similarly produce the second pairs of associated S-curve outputs correlated to the interfering X, interfering K, or second portion of the wide Ka band.

It will thus be appreciated from the foregoing, that during an X band sweep, first pairs of outputs signals at 16 may correlate to signals in the X band which may thus be valid police radar signals in that band, whereas second pairs of output signals at 18 may correlate to signals from the band of frequencies adjacent to the X band, i.e., from interfering first harmonics of the spurious LO signals from other radar detectors. Similarly, during a sweep of the K band, first pairs of outputs at 16 such as valid police radar signals in that band may correlate to signals in the K band and second pairs of outputs at 18 may correlate to the spurious LO signals such as the second harmonics thereof. On the other hand, during the wide Ka band sweep, first pairs of output signals at 16 may correlate to a first portion of the wide Ka band, particularly that portion including aspects of the wide Ka band that are not expected to include interfering LO signals or the harmonics thereof, such that the first pairs of IF signals at 16 may correlate to valid police radar signals in the wide Ka band. The second pairs of output signals at 18, however, may correlate to signals in a second portion of wide Ka bands that could be either valid police radar signals or spurious LO signals such as third harmonics thereof.

Outputs 16 and 18 are coupled to a processing detection and alert circuit 120 of back-end 20. Circuit 120 includes a first DSP processor 122 which analyzes the S-curve pairs of outputs at 16 and a second DSP processor 124 which analyzes the output pairs at 18. The processing may be as described in the aforementioned '007 patent by which to detect and initiate an alert in the presence in the signal pairs at 16 of associated pairs indicative of receipt of an actual signal corresponding to the frequency range being swept such as the X, K or first portion of the wide Ka band, with the wide Ka band taking priority over the K band, which in turn takes priority over the X band. If the wide Ka band sweep results in an associated pair of signals 16, then an alert may be given for Ka band police radar. Similarly, a K band alert or an X band alert may be given if an associated pair of signals 16 results from either the K band or the X band sweeps, respectively.

Additionally, and to eliminate false alerts from signals in the wide Ka band arising from spurious third harmonics of interfering LO signals, for example, second pairs of outputs at 18 from each sweep are evaluated to determine if there are associated pairs indicative of receipt of an actual signal corresponding to the frequency range being swept, such as adjacent X, adjacent K, or the second portion of the wide Ka band. If such an associated pair is found in the second portion of the wide Ka band, DSP processor 124 will determine if an associated pair is present in either one or both of the adjacent X and adjacent K ranges. If so, there is then made a determination as to whether there is a harmonic relationship between an associated second pair of outputs 18 during a wide band Ka sweep, and an associated pair of S-curve outputs from output 18 during either or both of an X band or K band sweep. If, during the operation of processor 124 an associated pair of outputs at 18 is detected and correlated to a signal in that second portion of the wide Ka band, then a determination is made as to whether a harmonically related signal was found during a prior or subsequent X or K band sweep by looking for and determining whether there are associated S-curve pairs at 18 during one or the other of the X and K band sweeps and then determining whether the time positioning of those pairs indicate a harmonic relationship and frequency between the detected interfering X or interfering K signal with the wide Ka band signal. If there is no such harmonic relationship, then an alert may be given for receipt of a wide Ka band signal in this circumstance as well. If, however, there is such a harmonic relationship, then no alert will be given at least in response to detection of that associated pair of signals at 18 during a wide Ka band sweep. Of course, if an associated S-curve pair is determined from output 16 during any one of the sweeps, then an appropriate alert will be given unless some other basis for rejection thereof is determined as might arise in situations related to other spurious signals or noises which are otherwise directly in the band of interest.

Sweep control 54 is operably coupled to processing, detection and alert circuit 120 so as to control the band being swept where necessary for the processing of the signals, particularly at 18. To this end, sweep control 54 will typically operate to cause the X, K and wide Ka bands to be individually and separately swept on a repeating basis. Where, however, a wide Ka band signal is detected due to the presence of a pair of associated signals at 18 during a wide Ka band sweep, it may be necessary to cause further sweeps of the wide Ka band or immediate re-sweeping of either the X or the K band without reversion to the wide Ka band.

During the X band sweep, 10 MHZ IF amplifier and detector 106 outputs IF signal pairs at 16 correlated to RF signals received by horn antenna 14 in the frequency ranges of 10.366–10.766 GHz and 12.434–12.834 GHz. This "direct" sweep output from first IF circuit 26 includes the X band. 10 MHZ IF amplifier and detector 110 outputs IF signal pairs at 18 that correlate to RF signals received by horn antenna 14 in the frequency ranges of 11.410–11.810 GHz and 11.390–11.790 GHz. This "interfering" sweep output from second IF circuit 28 thus includes interfering signals such as the typical fundamental frequency of a nuisance LO signal from another radar detector.

During the K band sweep, 10 MHZ IF amplifier and detector 106 outputs IF signal pairs at 16 correlated to RF signals received by the horn antenna 14 in the frequency ranges of 21.766–22.566 GHz and 23.834–24.634 GHz. This "direct" sweep output from first IF circuit 26 includes the K band. 10 MHZ IF amplifier and detector 110 outputs IF signal pairs at 18 correlated to RF signals received by horn antenna 14 in the frequency ranges of 22.790–23.590 GHz and 22.810–23.610 GHz. This "interfering" sweep output from second IF circuit 28 includes interfering signals such as the typical second harmonic of a nuisance LO signal.

During the wide Ka band sweep, 10 MHZ IF amplifier and detector 106 outputs IF signal pairs at 16 correlated to RF signals received by horn antenna 14 in the frequency ranges of 31.166–34.366 GHz and 35.234–36.434 GHz. This "direct" sweep output from first IF circuit 26 includes the first portion, i.e., the lower and upper aspects, of the wide Ka band. 10 MHZ IF amplifier and detector 110 outputs IF signal pairs at 18 correlated to RF signals received by horn antenna 14 in the frequency ranges of 34.190–35.390 GHz and 34.210–35.410 GHz. This "interfering" sweep output from second IF circuit 28 includes the second portion of wide Ka band and interfering signals such as the typical third harmonic of a nuisance LO signal.

First and second DSP processors 122, 124 operate with dual Discrete Fourier Transform architecture. At the end of each sweep, each DSP processor 122, 124 outputs a set of 32 peak indices for each of the data types, regardless of their amplitudes. These peak indices are first evaluated by signal threshold calculation and detection processing in circuit 120. A signal threshold is calculated by removing the three largest peaks from the list and calculating and scaling by a factor of 1.4 the mean value of the remaining peaks. The list of peak indices is reduced to those indices exceeding the threshold. Removing the largest peaks during threshold calculation helps in finding a threshold more closely related to the noise level in the list of peak indices.

Band determination is performed on the shorter peak list generated by the threshold step. This test is a matter of determining that a signal and an image exist in a given sweep with proper phase so as to create an associated first pair of IF signals at 16. A very wide tolerance is permitted on the signal to image spacing in order to dramatically reduce sensitivity to VCO linearity of the LO 60 while supporting the conclusion that a stable non-sweeping source is present.

Interfering sweeping signals may cause a signal that appears in the wide Ka band "direct" sweep output without a corresponding "interfering" sweep output signal. Consequently, a re-sweep may be used to reevaluate a band for a second appearance of the signal, rather than waiting for a complete three sweeps of the X, K and wide Ka bands to repeat, thereby enhancing sensitivity of the radar detector 10.

The band discrimination inherent in having a direct and interfering sweep output for each of the three sweeps allows for processing and detection advantages in the processing, detection and alert module 120. As an example, non-sweeping false wide Ka band signals can produce stationary components in the list of peak indices in the interfering sweep outputs for the X, K or wide Ka band sweeps. A direct wide Ka band sweep output can be rejected if a stationary component is found in relatively the same location during any of these three corresponding interfering sweep outputs.

As an additional example, due to the proliferation of a number of classes of radar products, a certain portion of the wide Ka band is highly likely to contain stationary false wide Ka band sources. This region is called the 'Ka-False' region and is advantageously handled with a separate layer of rejection processing. If a False Ka signal is found containing two or more components meeting the spacing criterion associated with non-valid sources, that region of the band is 'locked out' from any detection for four seconds. Because the X and K band signals are now swept separately, this Ka-False region can be managed more efficiently with fewer competing interpretations.

Sweeping nuisance signals tend to not create problems when averaging sweeps to reduce noise since they tend not to appear at the same frequency in subsequent sweeps. However, these sweeping nuisance signals may still cause problems based on single sweep detection or when signal strength is sufficient to exceed a threshold even with averaging. The band discrimination capabilities of the detector 10 allow for rejection for one sweep of a wide Ka band signal in the direct or interfering sweep output based on detection of a random signal in the interfering sweep output for the X band or K band until averaging or re-sweep can be performed. Additionally, the characteristics of a detected sweeping nuisance signal (e.g., duration, end points, mean and variance) may be more readily ascertained with the band discrimination capabilities. These characteristics may then be collected into a distribution table for adjusting sweeping wide Ka band nuisance signal rejection processing.

As another example, mixed interference signals may be detected that comprise a combination of sweeping and non-sweeping nuisance signals. The band discrimination aids in sorting out such signals for rejection processing, such as determining when to delay an alert until subsequent sweeps may be performed.

Figure 2:
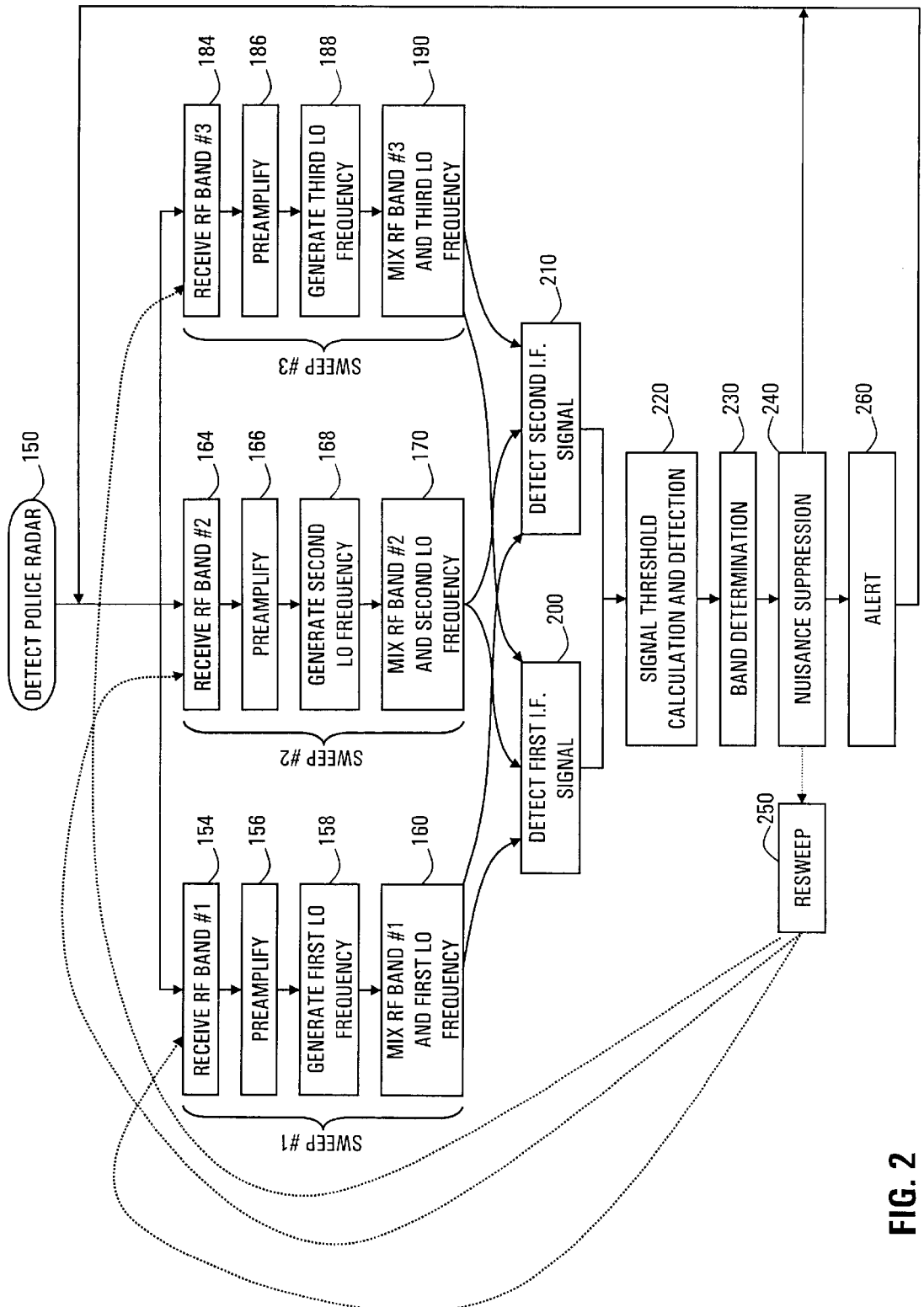
FIG. 2 is a flow diagram of a procedure for detecting police radar signals according to the principles of the invention.

Referring to FIG. 2, a procedure 150 for detecting police radar signals is depicted consistent with aspects of the invention. Three sweeps are performed for the three radar frequency (RF) bands. Each sweep results in two intermediate frequency (IF) signals that are processed to remove nuisance Ka band signals.

In particular, a first sweep begins with receiving a first RF band (block 154). The first RF band includes the police radar X band and an adjacent frequency range associated with nuisance sources, specifically other police radar detectors having a first oscillation frequency of 11.4–11.7 GHz. The first RF band may advantageously be preamplified to increase performance (block 156). Preamplification may include passive and/or active components to reduce noise and to increase the signal strength of received RF signals. A first local oscillation (LO) frequency is generated that is harmonically associated with the first RF band (block 158). This first LO frequency is mixed with the first RF band signals so as to step-down X band signals in the first RF band as a first IF signal in a direct sweep intermediate frequency (IF) range and step-down nuisance RF signals adjacent to the X band (e.g., 11.4–11.7 GHz) as a second IF signal in a interfering sweep IF range (block 160).

Similarly, a second sweep begins with receiving a second RF band (block 164). The second RF band includes the police radar K band and an adjacent frequency range associated with nuisance sources, specifically a second harmonic of the first oscillation frequency of 11.4–11.7 GHz (i.e., 22.8–23.4 GHz). The second RF band may advantageously be preamplified to increase performance (block 166). Preamplification may include passive and/or active components to reduce noise and to increase the signal strength of received RF signals. A second local oscillation (LO) frequency is generated that is harmonically associated with the second RF band (block 168). This second LO frequency is mixed with the second RF band signals so as to step-down K band signals in the second RF band as a first IF signal in the direct sweep IF range and step-down nuisance RF signals adjacent to the K band (e.g., 22.8–23.4 GHz) as a second IF signal in the interfering sweep IF range (block 170).

Similarly, a third sweep begins with receiving a third RF band (block 184). The third RF band includes the police radar Ka band and an overlapping frequency range associated with nuisance sources, specifically a third harmonic of the first oscillation frequency of 11.4–11.7 GHz (i.e., 34.2–35.1 GHz). These nuisance sources in the Ka band form a "Ka-false" region in a middle portion of the police radar Ka band. The third RF band may advantageously be preamplified to increase performance (block 186). Preamplification may include passive and/or active components to reduce noise and to increase the signal strength of received RF signals. A third local oscillation (LO) frequency is generated that is harmonically associated with the third RF band (block 188). This third LO frequency is mixed with the third RF band signals so as to step down Ka band signals outside of the Ka-false region in the third RF band as a first IF signal in the direct sweep IF range and step-down RF signals in the Ka-false region as a second IF signal in the interfering sweep IF range (block 190).

The first and second IF signals from the first, second and third sweeps are separately detected, as in blocks 200 and 210. Advantageously, the IF detection produces pairs of S-curves spaced in time in relation to the frequency of the source RF signal. Then, the background noise level is determined and a threshold used to exclude signals that do not significantly rise above the background noise level (block 220). Those signals above the threshold are characterized by band determination (block 230). In particular, the frequency and phase of each paired S-curve is evaluated. Unlike a previously known approach which solely relied upon signal pairs for band determination, even individual signals are evaluated for nuisance suppression (block 240), as described in more detail below, since their band of origin is more readily determined due to the three sweeps and two IF circuits. Since each RF band is individually swept, the RF band may be determined without relying on spacing of S-curve pairs. Therefore, many aspects of the below-described nuisance suppression techniques have applications to other types of signal representations.

Nuisance suppression (block 240) may optionally result in re-sweeping (block 250) a specific RF band having a detected RF signal, as may advantageously eliminate or mitigate sweeping RF nuisance sources without waiting for the intervening other RF bands to be swept.

If a detected RF signal or signals is deemed to be a nuisance signal in block 240, then processing returns to block 150 to continue sweeping without alerting a user. Otherwise, an alert is performed (block 260) and processing returns to block 150.

Figure 3:
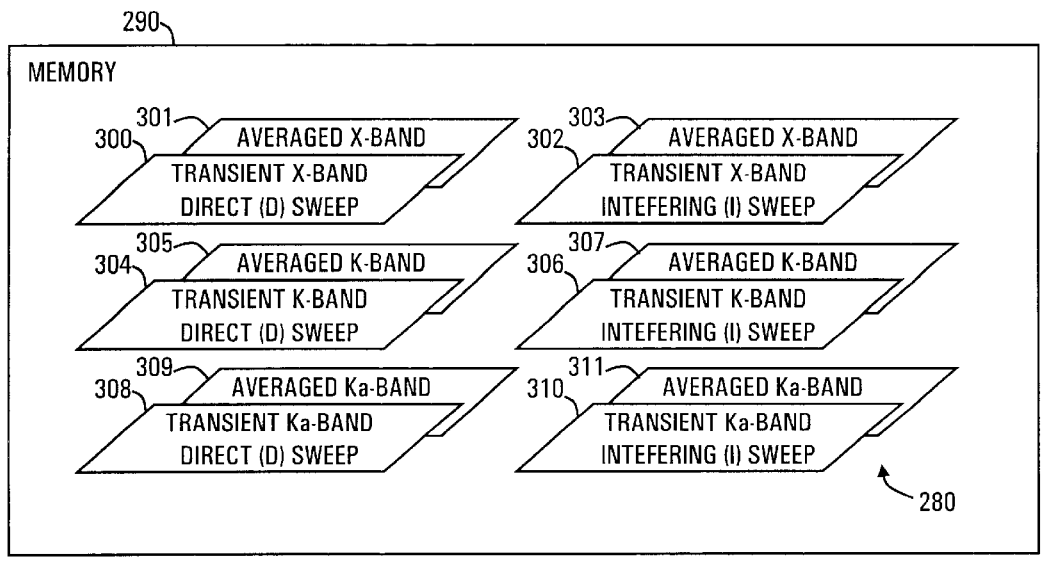
FIG. 3 is a depiction of stored sweep data in memory for the detect police radar procedure of FIG. 2.

Referring to FIG. 3, a depiction of a data structure 280 in memory 290 illustrates a number of output signals produced by the detect police radar procedure 150 of FIG. 2. Transient sweep outputs contain the results from a single sweep after signal threshold calculation and detection (block 220), whereas averaged sweep outputs contain a rolling average of a predetermined number of sweeps in the same range, advantageously reducing spurious noise and sweeping RF sources. Specifically, transient X band direct (D) sweep data 300 and averaged X band direct (D) sweep data 301 are produced from the first IF signal from the first sweep. The transient X band interfering (I) sweep data 302 and averaged X band interfering (I) sweep data 303 are produced from the second IF signal from the first sweep.

Transient K band direct (D) sweep data 304 and averaged K band direct (D) sweep data 305 are produced from the first IF signal from the second sweep. The transient K band interfering (I) sweep data 306 and averaged K band interfering (I) sweep data 307 are produced from the second IF signal from the second sweep.

Transient Ka band direct (D) sweep data 308 and averaged Ka band direct (D) sweep data 309 are produced from the first IF signal from the third sweep. The transient Ka band interfering (I) sweep data 310 and averaged Ka band interfering (I) sweep data 311 are produced from the second IF signal from the third sweep.

Figure 4:
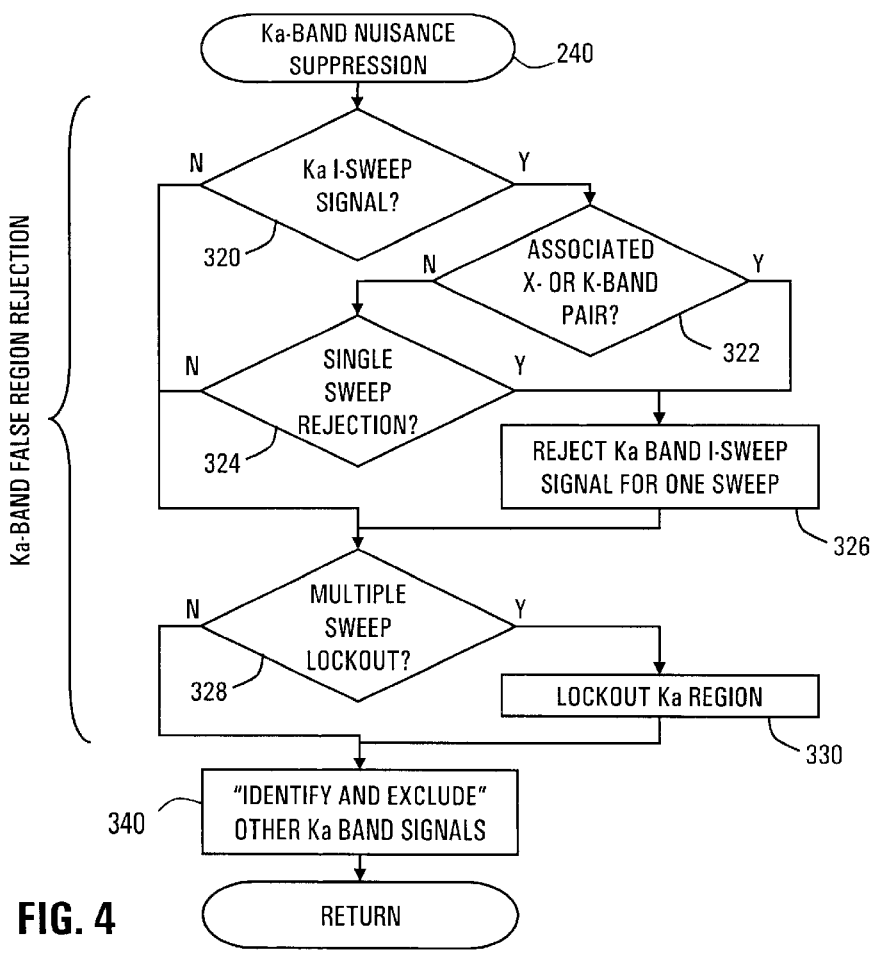
FIG. 4 is a flow diagram for the Ka band nuisance suppression procedure referenced in the detect police radar procedure of FIG. 2.

Referring to FIG. 4, the nuisance suppression procedure 240, referenced in the detect police radar procedure 150 of FIG. 2, is illustrated. In particular, a previously-known nuisance suppression technique for handling Ka band signals in the Ka-false region is depicted, which is enhanced due to the simplification in band determination described above.

At block 320, a determination is made as to whether a Ka band I-sweep signal is in the transient Ka band interfering (I) sweep data 310 (a.k.a., Ka-false region). If so, a determination is made as to whether a harmonically-related pair of signals exists in the transient X band interfering (I) sweep data 302 and/or the transient K band interfering (I) sweep data 306 (block 322). If not, a determination is made as to whether the criteria for single sweep rejection is satisfied (block 324). If either determination in block 322 or 324 is satisfied, then the Ka band I-sweep signal is rejected for one sweep (block 326).

Single sweep rejection (SSR) enhances nuisance suppression by looking for any one of the signals from the pairs of harmonically-related signals in the X band and K band. Consequently, even if the first or second harmonic is not fully received during a specific sweep, a false alarm is avoided. An SSR threshold is selected that is suitably high enough to prevent improperly designating a valid Ka signal a nuisance. This threshold SSR threshold is tiered, with lower thresholds used depending on the number of sweeps averaged.

If single sweep rejection criteria are not satisfied in block 324 or after rejection for one sweep in block 326, a determination is made whether the criteria are satisfied for multiple sweep lockout (MSL) (block 328). MSL prevents false alarms not prevented by single sweep rejection in block 324. In particular, the criteria for MSL are selected for a high certainty that another nuisance source such as a police radar detector is present, and so all candidate components in a Ka region (e.g., within 12% of the detected Ka band signal) can be locked out for a period of time (block 330), the time chosen to be typical for the duration of an encounter with an on-coming police radar detector (e.g., 4–15 seconds). The range around the Ka band to be locked out would depend on variances in the detection system, etc.

After Ka band false region rejection in blocks 320–330, a procedure to "identify and exclude" other Ka band signals (block 340) is performed consistent with principles of the invention, enabled by the enhanced sources of sweep data structure 300–311 with inherent band discrimination. Then the nuisance suppression procedure 240 returns to the detect police radar procedure 150.

Figure 5:
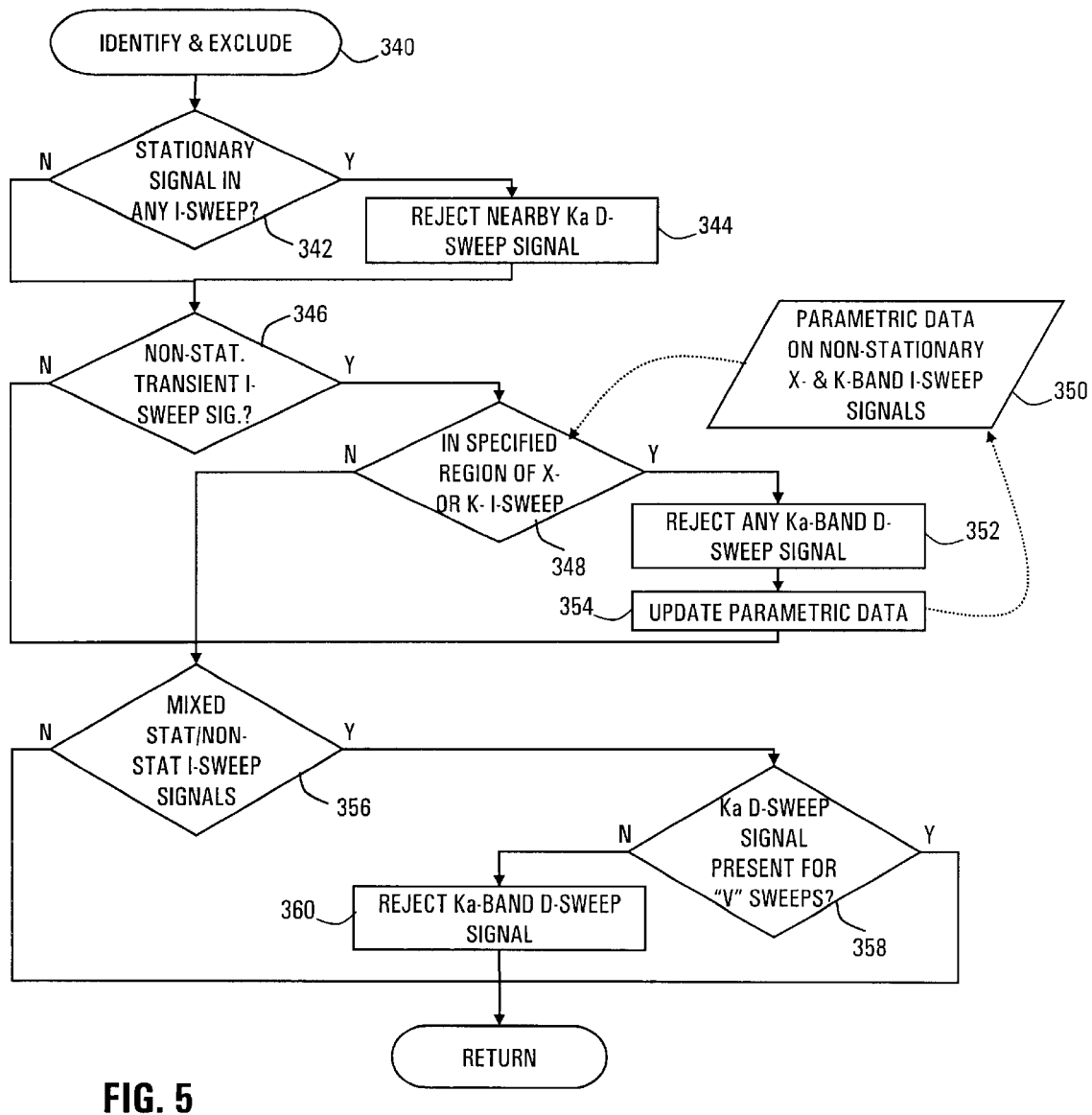
FIG. 5 is a flow diagram for the identify and exclude procedure referenced in the nuisance suppression procedure of FIG. 4.

Referring to FIG. 5, the "identify and exclude" procedure 340, referenced in FIG. 4, further suppresses other types of nuisance signals that are present in the Ka band D-sweep data 308, 309: stationary interferences sources, nonstationary interference sources, and mixed stationary and nonstationary interference sources.

First, a determination is made as to whether any stationary signal is present in any transient or average I-sweep data 302, 303, 306, 307, 310, 311. If so, any nearby Ka band signal in the Ka band D-sweep data 308, 309 is rejected (block 344).

After blocks 342 and 344, a determination is made as to whether a nonstationary signal is present in the transient X band and/or K band I-sweep data 302, 306 (block 346). If present, then a Ka band nuisance signal may also be present in the transient Ka band D-sweep data 308 that may not correspond harmonically to its X- or K band component.

Preventing false alarms is achieved by determining whether the detected signal in the data 302, 306 is within a specified region of the X band or K band I-sweep data 302, 306 (block 348). Parametric data on non-stationary X- and K band I-sweep signals is referenced (block 350). If within a specific region, any Ka band signal in the transient D-sweep data 310 is rejected (block 352). Initially, such parametric data is predetermined from field deployment statistics for the anticipated locations for the police radar detector. This parametric data may advantageously be updated to be more representative of the actual environment (block 354).

If the determinations are not satisfied in blocks 346 or 348, or after block 354, then a determination is made as to whether mixed stationary and nonstationary signals are present in Ka band D- and I-sweep data 308, 310 (block 356). If so, a determination is made as to whether a stationary signal has continued to be present in the Ka band D-sweep data 308 for a predetermined number "V" sweeps (block 358). If not, then the Ka band signal is rejected (block 360) and routine 340 returns. Also, if the determinations in block 356 and 358 are not satisfied, then routine 340 returns.

In use, each band of interest (X, K and wide Ka bands) is separately swept and first and second pairs of IF outputs are generated. The first pair is correlated to valid police radar signals in the X, K and wide Ka band during their respective sweeps. The second pairs are correlated to interfering X, interfering K, or the second portion of the wide Ka band and interfering Ka signals, during the same respective sweeps. The second pairs for the wide Ka band sweep that are harmonically related to a second pair from either of the X and K band sweeps are rejected as interfering signals.

As shown in the table below, each band is separately swept as determined by the state of lines 56, 58 and switch lines 84, 86 as follows:

| | SWEEP CONTROL | | | | OUTPUT | |
|---|---|---|---|---|---|---|
| SWEEP | X LNA | K/Ka LNA | 1034 MHZ Switch | 10 MHZ Switch | 1034 MHZ (1$^{st}$ IF signal) | 10 MHZ (2$^{nd}$ IF signal) |
| X | ON | OFF | UP | UP | 10.366–10.766 GHz, 12.434–12.834 GHz | 11.410–11.810 GHz, 11.390–11.790 GHz |
| K | OFF | ON | UP | UP | 21.766–22.566 GHz, 23.834–24.634 GHz | 22.790–23.590 GHz, 22.810–23.610 GHZ |
| Ka | OFF | ON | DOWN | DOWN | 31.166–34.366 GHz, 35.234–36.434 GHz | 34.190–35.390 GHz, 34.210–35.410 GHz |

By virtue of the foregoing, there is thus provided a police radar detector which has improved sensitivity without sacrificing the advantages of an LO that is at a frequency adjacent to at least the lower bands of interest, including the suppression of false wide Ka band signals afforded thereby.

While the present invention has been illustrated by a description of various embodiments and while those embodiments have been described in considerable detail, it is not the intention of the applicant to restrict or in any way limit the scope of the appended claims to such detail. Additional advantages and modifications will readily appear to those skilled in the art. By way of example, while the radar detector 10 is adapted to deal with police radar signals in the X, K and wide Ka bands, it will be appreciated that the principles of the invention may be applied to any three frequency bands that are quasi-harmonically related in that the interfering LO harmonics are adjacent to the one or both of the lower two frequency bands, but within the third, highest band. Similarly, the principles of the present invention are applicable to radar detectors that sweep only or at least two quasi-harmonically related bands, e.g., the K and wide Ka bands, where one of the interfering LO harmonics is adjacent to one of the bands and another of the harmonics is in the other band. Moreover, although a broadband antenna 14 capable of receiving X, K and wide Ka band signals is shown for illustration purposes, it will be appreciated that the antenna may actually comprise multiple horns tuned to the respective frequency bands of interest. Also, while the X, K and wide Ka bands are shown as being swept in that order, it will be appreciated that the bands may be swept in any order with the illustrative order chosen for clarity. Also, other arrangements, combinations or numbers of LNA's, diplexers, mixers, and LO's may be provided to yield signals for the dual IF circuits whereby to produce the desired first and second pairs of IF signals and allow rejection of spurious wide Ka band signals due to harmonics of interfering LO signals. To this end, if sufficient circuitry is provided, each of the three bands may be separately, but concurrently swept, so as to further reduce the time necessary to obtain the IF signals and determine whether valid police radar signals are present. The invention in its broader aspects is therefore not limited to the specific details, representative apparatus and method, and illustrative example shown and described. Accordingly, departures may be made from such details without departing from the spirit or scope of applicant's general inventive concept.

Having described the invention, what is claimed is:

1. In a police radar detector adapted to detect police radar signals in the X, K and wide Ka police radar bands, a method of rejecting interfering signals operating within a frequency range adjacent to at least one of the X and K police radar bands, the method comprising:

separately:
sweeping the X police radar band and a frequency range adjacent to the X band with a first LO frequency, and outputting first pairs of IF signals being correlated to valid police radar signals in the X band and second pairs of IF signals being correlated to interfering signals in the adjacent frequency range;
sweeping the K police radar band and a frequency range adjacent to the K band with a second LO frequency, and outputting first pairs of IF signals being correlated to valid police radar signals in the K band and second pairs of IF signals being correlated to interfering signals in the adjacent frequency range; and
sweeping the wide Ka police radar band with a third LO frequency, and outputting first pairs of IF signals being correlated to valid police radar signals in a first portion of the wide Ka band and second pairs of IF signals being correlated to both valid police radar signals in a second portion of the wide Ka band and to interfering signals in said second portion; and
rejecting as interfering signals those second pairs of IF signals output during said Ka band sweep which are harmonically related to at least one of the second pairs of IF signals from said X band sweep and said K band sweep.

2. The method of claim 1 wherein rejecting as interfering signals comprises rejecting those second pairs of IF signals output during said Ka band sweep which are harmonically related to at least one of the second pairs of IF signals from both said X band sweep and said K band sweep.

3. The method of claim 1 wherein rejecting as interfering signals comprises rejecting those second pairs of IF signals output during said Ka band sweep which are harmonically related to one of the second pairs of IF signals from said X band sweep.

4. The method of claim 1 wherein rejecting as interfering signals comprises rejecting those second pairs of IF signals output during said Ka band sweep which are harmonically related to one of the second pairs of IF signals from said K band sweep.

5. The method of claim 1 further comprising providing a local oscillator adapted to output an LO signal having a plurality of harmonics corresponding to the first, second, and third LO frequencies.

6. In a police radar detector adapted to detect police radar signals in at least first and second quasi-harmonically related police radar bands, a method of rejecting interfering signals operating within a frequency range adjacent to at least one of the first and second police radar bands, the method comprising:

separately:
sweeping the first police radar band and a frequency range adjacent to the first band with a first LO frequency and outputting IF signals being correlated to interfering signals in the adjacent frequency range; and sweeping the second police radar band with a second LO frequency and outputting IF signals being correlated to both valid police radar signals in a portion of the second band and to interfering signals in said portion; and rejecting as interfering signals those IF signals output during said second band sweep which are harmonically related to one of the IF signals from said first band sweep.

7. The method of claim 6 wherein said police radar detector is adapted to detect police radar signals in a third police radar band quasi-harmonically related to said first and second bands, the method further comprising:

separately sweeping the third police radar band and a frequency range adjacent to the third band with a third LO frequency and outputting IF signals being correlated to interfering signals in the adjacent frequency range; and rejecting as interfering IF signals the IF signals output during said second band sweep which are harmonically related to at least one of the IF signals from said first band second sweep and the third band sweep.

8. The method of claim 7 wherein rejecting as interfering signals comprises rejecting those IF signals output during said second band sweep which are harmonically related to the IF signals from both said first band sweep and said third band sweep.

9. The method of claim 7 wherein rejecting as interfering signals comprises rejecting those IF signals output during said second band sweep which are harmonically related to one of the IF signals from said first band sweep.

10. The method of claim 7 further comprising rejecting as interfering signals those IF signals output during said second band sweep which are harmonically related to one of the IF signals from said third band sweep.

11. The method of claim 7 further comprising providing a local oscillator adapted to output an LO signal having a plurality of harmonics corresponding to the first, second, and third LO frequencies.

12. The method of claim 6 further comprising providing a local oscillator adapted to output an LO signal having a plurality of harmonics corresponding to the first and second LO frequencies.

13. In a police radar detector adapted to detect police radar signals in the X, K and wide Ka police radar bands, a method of rejecting interfering LO signals from other radar detectors, the method comprising:

separately sweeping each of the X, K and wide Ka police radar bands;

outputting for each said sweep first IF signals being correlated to valid police radar signals in the X, K and a first portion of the wide Ka band, respectively, and second IF signals being correlated to interfering LO signals from said X and K band sweeps, respectively, and being correlated to both valid police radar signals in a second portion of the wide Ka band and to interfering LO signals in said second portion during said wide Ka band sweep; and rejecting as interfering LO signals those second IF signals output from said Ka band sweep which are harmonically related to at least one of the second IF signals from said X band sweep and said K band sweep.

14. The method of claim 13 wherein rejecting as interfering LO signals comprises rejecting those second IF signals output from said Ka band sweep which are harmonically related to one of the second IF signals from both said X band sweep and said K band sweep.

15. The method of claim 13 wherein rejecting as interfering LO signals comprises rejecting those second IF signals output from said Ka band sweep which are harmonically related to one of the second IF signals from said X band sweep.

16. The method of claim 13 wherein rejecting as interfering LO signals comprises rejecting those second IF signals output from said Ka band sweep which are harmonically related to one of the second IF signals from said K band sweep.

17. In a police radar detector adapted to detect police radar signals in at least first and second quasi-harmonically related police radar bands, a method of rejecting interfering LO signals from other radar detectors, the method comprising:

separately sweeping each of the first and second police radar bands;

outputting for said sweep of the first band pairs of IF signals being correlated to interfering LO signals from said first band sweep;

outputting for said sweep of the second band pairs of IF signals being correlated to both valid police radar signals in a portion of the second band and to interfering LO signals in said portion during said second band sweep; and rejecting as interfering LO signals those pairs of IF signals output from said second band sweep which are harmonically related to one of the pairs of IF signals from said first band sweep.

18. The method of claim 17 wherein said police radar detector is adapted to detect police radar signals in a third police radar band quasi-harmonically related to said first and second bands, the method further comprising:

separately sweeping said third police radar band;

outputs for said sweep of the third band pairs of IF signals being correlated to interfering LO signals from said third band sweep; and rejecting as interfering LO signals those pairs of IF signals from said second band sweep which are harmonically related to at least one of the pairs of IF signals from said first band sweep and said third band sweep.

19. The method of claim 18 wherein rejecting as interfering LO signals comprises rejecting those IF signals output from said second band sweep which are harmonically related to one of the IF signals from both said first band sweep and said third band sweep.

20. The method of claim 18 wherein rejecting as interfering LO signals comprises rejecting those IF signals output from said second band sweep which are harmonically related to one of the IF signals from said first band sweep.

21. The method of claim 18 wherein rejecting as interfering LO signals comprises rejecting those IF signals output from said second band sweep which are harmonically related to one of the IF signals from said third band sweep.

22. The method of claim 18 further comprising providing a local oscillator adapted to output an LO signal from said sweeps, the LO signal having a plurality of harmonics correlated to the first, second, and third bands.

23. The method of claim 17 further comprising providing a local oscillator adapted to output an LO signal from said sweeps, the LO signal having a plurality of harmonics corresponding to the first and second band.

24. A police radar detector adapted to detect police radar signals in the X, K and wide Ka bands and to reject interfering LO signals, the police radar detector comprising:
receiver circuitry adapted to separately sweep each of said X, K, and wide Ka bands, the receiver circuitry further adapted to produce for each such sweep output signals being correlated to police radar signals and interfering LO signals for said sweeps;
a first IF circuit coupled to the receiver circuitry and adapted to output for each said sweep first IF signals being correlated to valid police radar signals in the X, K and a first portion of the wide Ka band, respectively; and
a second IF circuit coupled to the receiver circuitry and adapted to output for each said sweep second IF signals being correlated to interfering LO signals for said X and K band sweeps, respectively, and being correlated to valid police radar signals and interfering LO signals in a second portion of the wide Ka band for said wide Ka band sweep, whereby those second IF signals output from said wide Ka band sweep which are harmonically related to at least one of the second IF signals for said X band sweep and said K band sweep may be rejected as interfering LO signals.

25. The police radar detector of claim 24, further including an antenna operatively coupled to the receiver circuitry and adapted to receive police radar signals in the X, K and wide Ka bands and interfering LO signals.

26. The police radar detector of claim 24, wherein the receiver circuitry further comprises a band separation stage and a mixer stage.

27. The police radar detector of claim 26, wherein the band separation stage includes a plurality of diplexers and amplifiers whereby to selectively couple signals in at least one of the X, K and wide Ka bands and interfering LO signals associated therewith to the mixer stage.

28. The police radar detector of claim 27, wherein the mixer stage includes a plurality of diplexers and switches adapted to selectively output signals correlated to one of the X, K and wide Ka bands and interfering LO signals in relation to said sweep.

29. The police radar detector of claim 24, wherein the receiver circuitry includes a local oscillator adapted to produce a swept LO signal having a plurality of harmonics corresponding to the X, K and wide Ka bands.

30. The police radar detector of claim 24, wherein the receiver circuitry includes:
a plurality of diplexers, selectively energizable amplifiers, and switches cooperating to output said signals in relation to said sweep.

31. The police radar detector of claim 24 wherein the receiver circuitry includes a plurality of selectively energizable low noise amplifiers.

32. The police radar detector of claim 31 wherein the receiver circuitry further includes a diplexer adapted to separate signals into a first set of signals associated with the X band, and a second set of signals associated with the K and wide Ka bands, the diplexer being coupled to a pair of said amplifiers whereby to separately amplify the first and second set of signals.

33. The police radar detector of claim 32 further comprising a plurality of diplexers and switches operatively associated with the amplifiers and adapted, in coordination with said amplifiers being selectively energized, to output signals associated with only one of the X, K and wide Ka bands in relation to said sweep.

34. A police radar detector adapted to detect police radar signals in the X, K and wide Ka bands and to reject interfering LO signals, the police radar detector comprising:
receiver circuitry adapted to separately sweep each of said X, K, and wide Ka bands, wherein during said X and K sweeps the receiver circuitry further sweeps frequencies adjacent to the respective said X and K bands that include interfering LO signals, the receiver circuitry further adapted to produce for each such sweep output signals being correlated to police radar signals and interfering LO signals for said sweeps;
a first IF circuit coupled to the receiver circuitry and adapted to output for each said sweep first pairs of IF signals being correlated to valid police radar signals in the X, K and a first portion of the wide Ka band, respectively; and
a second IF circuit coupled to the receiver circuitry and adapted to output for each said sweep second pairs of IF signals being correlated to interfering LO signals for said X and K band sweeps, respectively, and being correlated to valid police radar signals and interfering LO signals in a second portion of the wide Ka band for said wide Ka band sweep, whereby those second pairs of IF signals output from said wide Ka band sweep which are harmonically related to at least one of the second IF signals for said X band sweep and said K band sweep may be rejected as interfering LO signals.

35. The police radar detector of claim 34, further including an antenna operatively coupled to the receiver circuitry and adapted to receive police radar signals in the X, K and wide Ka bands and interfering LO signals.

36. The police radar detector of claim 34, wherein the receiver circuitry further comprises a band separation stage and a mixer stage.

37. The police radar detector of claim 36, wherein the band separation stage includes a plurality of diplexers and amplifiers whereby to selectively couple signals in at least one of the X, K and wide Ka bands and interfering LO signals associated therewith to the mixer stage.

38. The police radar detector of claim 37, wherein the mixer stage includes a plurality of diplexers and switches adapted to selectively output signals correlated to one of the X, K and wide Ka bands and interfering LO signals in relation to said sweep.

39. The police radar detector of claim 34, wherein the receiver circuitry includes a local oscillator adapted to produce a swept LO signal having a plurality of harmonics corresponding to the X, K and wide Ka bands.

40. The police radar detector of claim 34, wherein the receiver circuitry includes:
a plurality of diplexers, selectively energizable amplifiers, and switches cooperating to output said signals in relation to said sweep.

41. The police radar detector of claim 34 wherein the receiver circuitry includes a plurality of selectively energizable low noise ampliefrs.

42. The police radar detector of claim 41 wherein the receiver circuitry further includes a diplexer adapted to separate signals into a first set of signals associated with the X band and associated interfering LO signals, and a second set of signals associated with the K and wide Ka bands and associated interfering LO signals, the diplexer being coupled to a pair of said amplifiers whereby to separately amplify the first and second set of signals.

43. The police radar detector of claim 42 further comprising a plurality of diplexers and switches operatively associated with the amplifiers and adapted, in coordination with said amplifiers being selectively energized, to output signals associated with only one of the X, K and wide Ka bands and associated interfering LO signals in relation to said sweep.

\* \* \* \* \*